United States Patent [19]

Shervington et al.

[11] Patent Number: 5,714,823
[45] Date of Patent: Feb. 3, 1998

[54] QUASI REGULATED PERMANENT MAGNET GENERATOR

[75] Inventors: Roger M. Shervington; Hassan Mansir, both of Rockford; Dennis M. Kramer, Belvidere, all of Ill.

[73] Assignee: Sundstrand Corporation, Rockford, Ill.

[21] Appl. No.: 298,483

[22] Filed: Aug. 29, 1994

[51] Int. Cl.⁶ .................................................. H02K 19/12
[52] U.S. Cl. .......................... 310/184; 310/79; 310/179
[58] Field of Search .......................... 310/79–84, 179, 310/184

[56] References Cited

U.S. PATENT DOCUMENTS

| | | | |
|---|---|---|---|
| 3,325,661 | 6/1967 | Parsons | 310/179 |
| 3,594,595 | 7/1971 | Williams et al. | 310/168 |
| 3,601,685 | 8/1971 | Kuhn | 322/28 |
| 3,601,688 | 8/1971 | Dogadko et al. | 323/20 |
| 3,633,083 | 1/1972 | Teodorescu | 318/225 R |
| 3,641,467 | 2/1972 | Ringland et al. | 336/5 |
| 3,671,788 | 6/1972 | Knudson et al. | 310/156 |
| 3,745,442 | 7/1973 | Gynn | 322/24 |
| 4,138,619 | 2/1979 | Broadway et al. | 310/184 |
| 4,168,459 | 9/1979 | Roesel | 322/29 |
| 4,454,465 | 6/1984 | Greene | 310/184 |
| 4,663,581 | 5/1987 | Glennon | 322/52 |
| 4,777,397 | 10/1988 | Parshall | 310/156 |
| 4,931,760 | 6/1990 | Yamaguchi et al. | 335/306 |
| 4,959,605 | 9/1990 | Vaidya et al. | 322/10 |
| 4,973,896 | 11/1990 | Shiga et al. | 322/28 |
| 5,179,308 | 1/1993 | Malsky | 310/90.5 |
| 5,214,371 | 5/1993 | Naidu | 322/29 |
| 5,327,069 | 7/1994 | Radun et al. | 322/10 |
| 5,656,379 | 8/1997 | McCarty | 310/181 |

FOREIGN PATENT DOCUMENTS

| | | |
|---|---|---|
| 2051626 | 8/1991 | Canada. |
| 2114728 | 9/1972 | Germany. |

Primary Examiner—Steven L. Stephan
Attorney, Agent, or Firm—Jeffery J. Makeever

[57] ABSTRACT

A quasi regulated electric generator, comprising a stator having teeth on an inner periphery defining slots therebetween, stator windings disposed in the slots forming output phases, a rotor rotatably mounted within the stator, the rotor having permanent magnets mounted thereon forming rotor poles which induce a voltage in the stator windings when the rotor is driven by an external prime mover, and a series saturation circuit coupled to an external source of dc current for saturating the stator, decreasing the induced voltage thereby. Magnetic slot closers are placed in the slots in which are disposed the series saturation circuit to aid tooth saturation.

23 Claims, 17 Drawing Sheets

QUASI REGULATED PERMANENT MAGNET GENERATOR

FIELD OF THE INVENTION

The instant invention relates generally to permanent magnet generators, and more particularly to a permanent magnet generator whose output voltage is quasi regulated by saturation of the stator, thereby allowing operation over a wide speed range with a limited voltage output.

BACKGROUND ART

Permanent magnet generators have long been used as a source of electrical energy in aerospace applications because of their relatively simple, rugged, compact construction. Unlike an electromagnetic generator which has rotor windings requiring some form of external excitation to establish a rotating magnetic field, the permanent magnet generator utilizes several permanent magnets mounted on the rotor to establish the field, and therefore, requires no external excitation. The pole forming permanent magnets generate a constant magnetic field which, when the rotor is driven by a prime mover, induces a voltage in the stator windings. Since the excitation of the machine is fixed by the properties of the permanent magnetic material used to form the rotor magnets, typically samarium-cobalt, neodymium-ironboron, alnico, or other such material, the output voltage decreases with increased output current demand. As the speed of the rotor is increased, however, the output voltage magnitude also increases such that a family of curves, each relating output voltage to output current at a specific speed, are formed as is illustrated in FIG. 1.

For most applications which use permanent magnet generators, the operational speed range of the machine is typically fairly narrow, resulting in a fairly consistent output voltage characteristic over the speed range. One problem associated with the use of a permanent magnet generator, however, is realized if the particular system application requires operation over a wide speed range. For such applications the increasing voltage with increasing speed characteristic of the machine often forces the use of either a mechanical regulation scheme, which varies the magnetic coupling of the magnets with respect to the stator or with respect to one another, or a specially constructed consequent pole rotor machine utilizing hybrid excitation of a control coil to change the flux in the magnetic poles and in the ferromagnetic poles of the consequent pole rotor as described in U.S. Pat. No. 4,656,379. Such methods, however, increase the cost and complexity of the machine, requiring either an additional mechanical apparatus or the use of a non-standard specially constructed rotor and a modified stator. The use of such methods to allow operation of the permanent magnet machine over a wide speed range oftentimes removes the incentive for its use in the first place, as the machine no longer has a simple, rugged, cost effective construction.

To supply electrical power to an actuating system, for example, a generator is often required to provide rectified power to a solid state converter having a nominal 270V dc link. If the generator is driven by an auxiliary gearbox, the speed typically will vary over a 2:1 speed range, where 100% speed may be 18,000 rpm. Therefore 50% speed is 9,000 rpm and an overspeed of 120% or 21,600 rpm prevails. The need for simplicity and maximum reliability in this type of system will dictate the choice of a permanent magnet generator (PMG) as the power source. The overriding constraint on the generator, however, is that at overspeed the output voltage at zero or light load cannot exceed the voltage break-down rating of the solid state devices in the converter.

The problem is to design a PMG which will produce a sufficiently high voltage when fully loaded at minimum speed (50% speed), but which will not exceed the maximum voltage capacity of the solid state devices at overspeed (120% speed). The impossible nature of this task using conventional designs is indicated by remembering that the output voltage of a PMG is proportional to the speed. With the requirement that the PMG generate a minimum of 270V at 50% speed carrying full loaded, the output voltage of a conventional PMG at 120% speed with the same load would be 648V. This overspeed voltage already exceeds the existing 600 volt rating of the solid state devices in the converter, and will continue to elevate as the electrical load is reduced.

As may be appreciated from this exemplary system therefore, it is highly desirable to have a permanent magnet generator which has a voltage limited characteristic at high speed, thus allowing operation over a wide speed range without damaging down stream components or equipment. It is desirable as well that such a machine utilize a conventional rotor and stator construction without additional mechanical structure to minimize cost, and to maximize simplicity and reliability.

SUMMARY OF THE INVENTION

It is the principle objective of the instant invention to provide a new and improved permanent magnet generator. More particularly, it is the objective of the instant invention to provide a permanent magnet generator utilizing a conventional rotor and stator construction and whose output voltage is quasi regulated by means of stator saturation to allow operation of the generator over a wide speed range with a limited output voltage at high speed.

In a preferred embodiment of the instant invention, the electric generator comprises a stator having teeth on an inner periphery defining slots therebetween. At least two sets of stator windings are disposed in the slots forming at least two phases. The rotor is rotatably mounted within the inner periphery of the stator, and has a plurality of permanent magnets mounted thereon forming the rotor's poles. These permanent magnets induce a voltage in the stator windings when the rotor is driven by an external prime mover. The permanent magnet generator of the preferred embodiment also includes means coupled to an external source of dc current for saturating the stator, decreasing the induced voltage thereby.

In an embodiment of the instant invention, the stator further comprises stator yoke slots defined in an outer periphery of the stator in which is disposed at least one yoke saturating coil through which dc saturating current is passed to saturate the stator. As an alternative, less than all of the sets of stator windings are coupled in series with the yoke saturating coil to form a series saturation circuit. This series saturation circuit is then coupled to the external source of dc current to saturate the stator. An additional associated set of stator windings may be added and coupled in series opposition to those included in the saturation circuit to cancel the voltage induced on the windings from the permanent magnets of the rotor as it is driven by the prime mover.

In a highly preferred embodiment of the instant invention, the means for saturating the stator comprises additional associated sets of stator windings forming additional phases associated with less than all of the sets of stator windings in the stator slots. These additional associated sets of stator windings are coupled in series opposition to less than all of the sets of stator windings forming a series saturation circuit which is coupled to the source of dc current to saturate the stator, or more specifically the stator teeth. Preferably, at least one magnetic slot closer is inserted into the stator slots in which is disposed this series saturation circuit.

BRIEF DESCRIPTION OF THE DRAWINGS

While the specification concludes with claims particularly pointing out and distinctly claiming that which is regarded as the present invention, the organization, the advantages, and further objects of the invention may be readily ascertained by one skilled in the art from the following detailed description when read in conjunction with the accompanying drawings in which:

DESCRIPTION OF THE PREFERRED EMBODIMENTS

Figure 1:
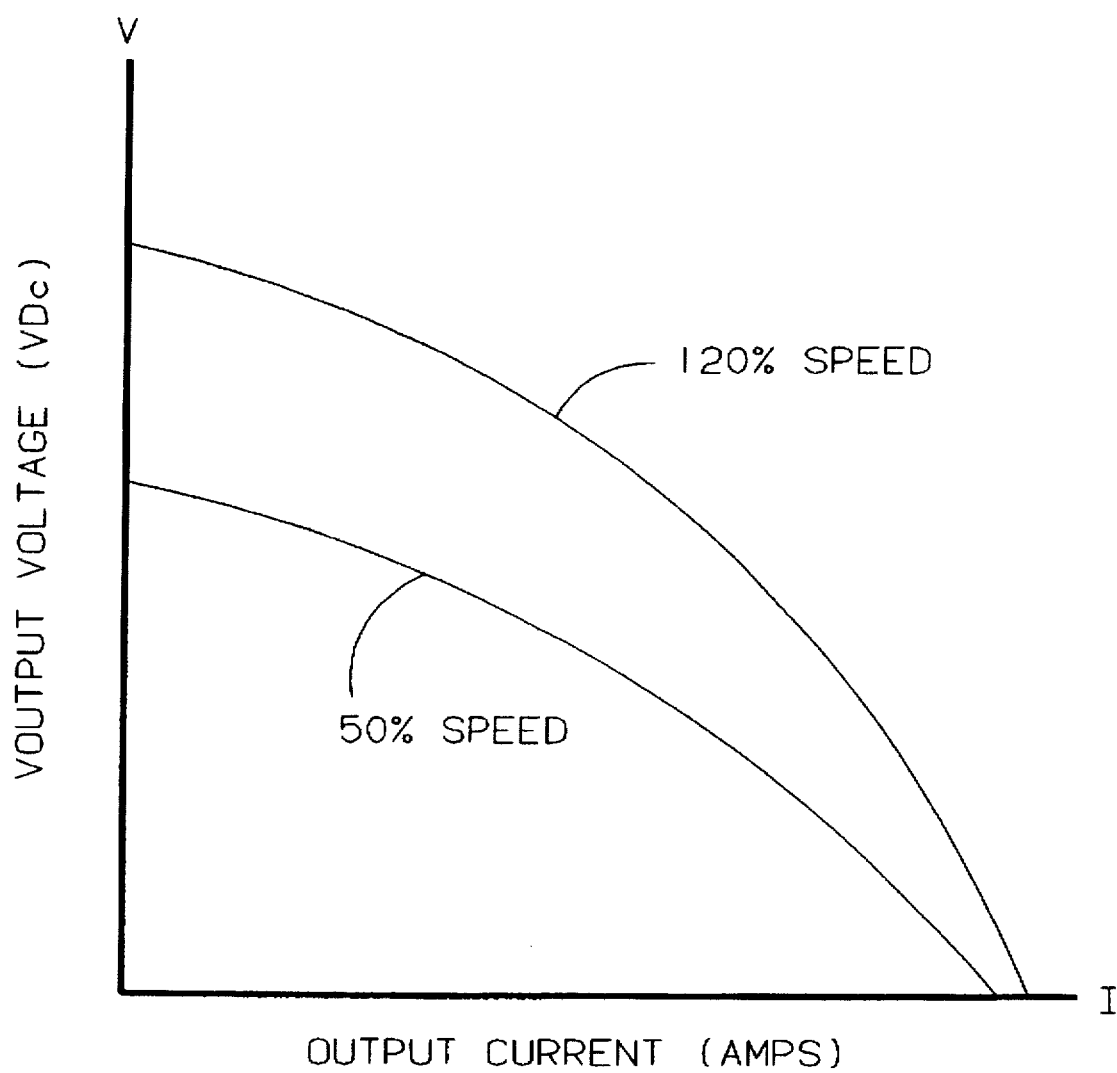
FIG. 1 is an output characteristic graphic illustrating a typical PMG output characteristic at various speeds.
Figure 2:
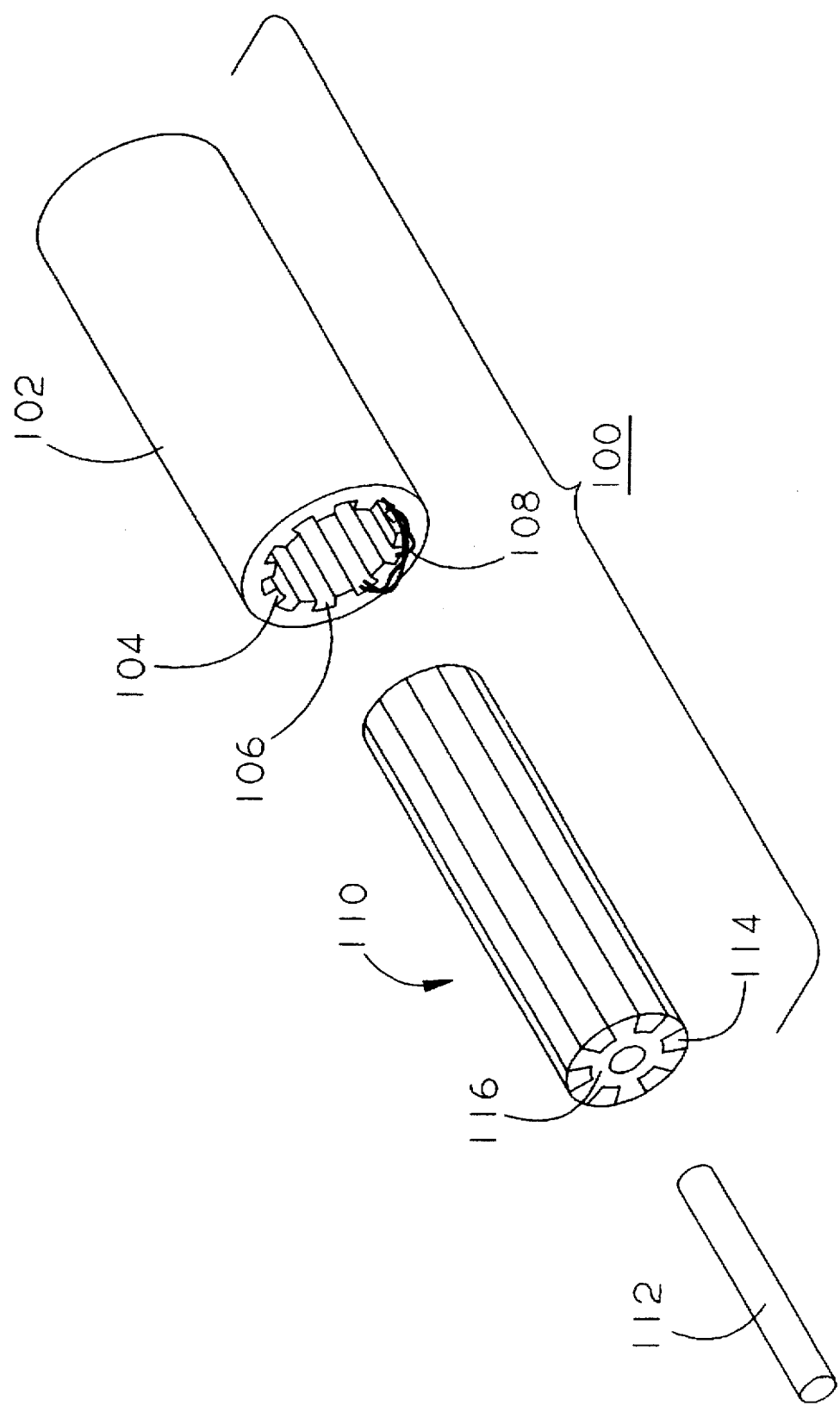
FIG. 2 is an exploded diagram of the electric generator of the instant invention.

In an exemplary embodiment of the instant invention, as shown in FIG. 2, the electric generator 100 comprises a stator 102 having teeth 104 on its inner periphery defining slots 106 therebetween. A plurality of stator windings 108 are disposed in the slots 106 of the stator 102, and form electrical phases of the generator 100. A rotor 110 is rotatably mounted within the inner periphery of the stator 102, and is typically drivably coupled by a shaft 112 to a prime mover (not shown). The rotor 110 has a plurality of permanent magnets 114 mounted on the rotor core 116 which form the rotor poles. The electric generator of the instant invention further comprises means for saturating the stator 102 as will be described hereinbelow.

Figure 3:
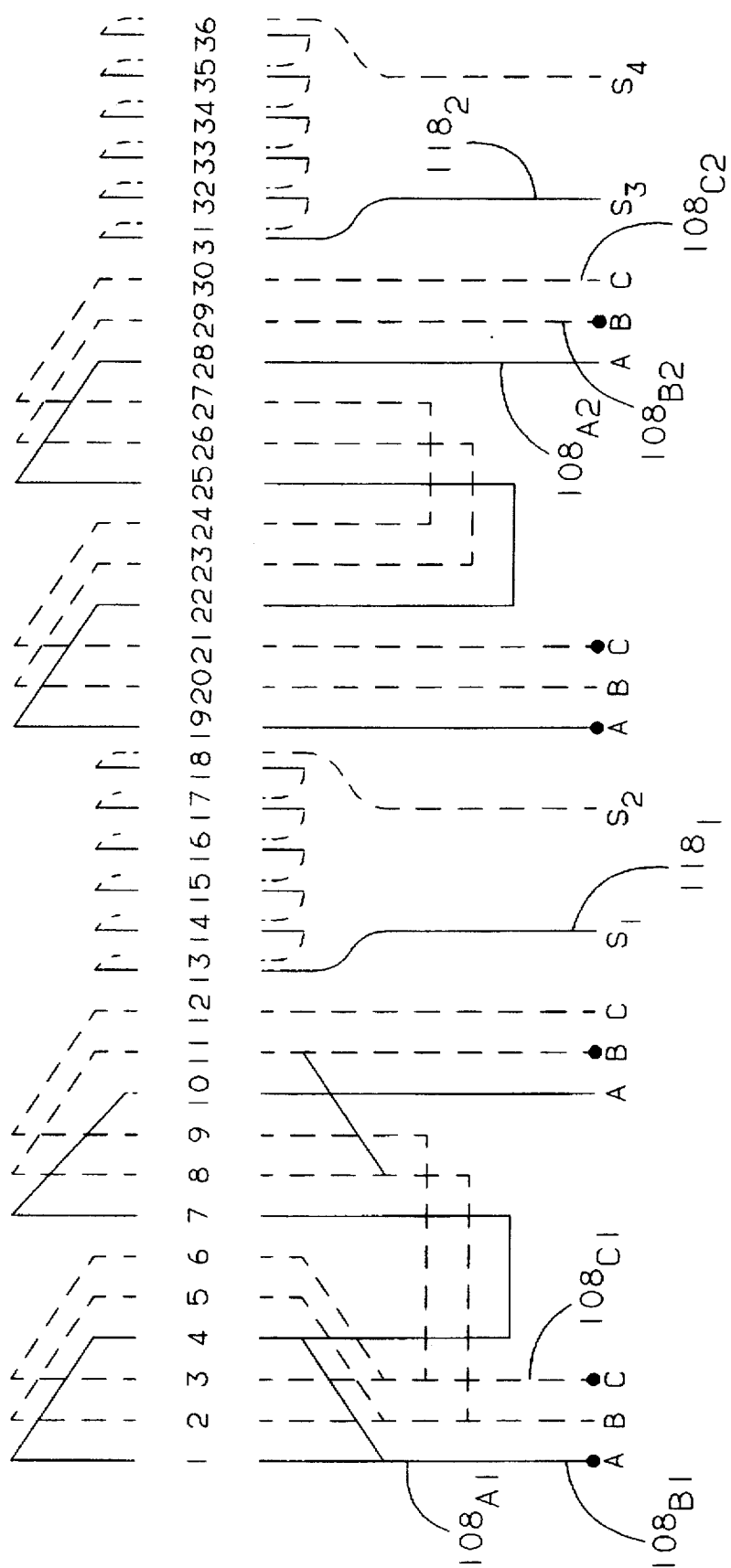
FIG. 3 is a wiring schematic diagram of an embodiment of the instant invention.

A stator wiring configuration for an exemplary embodiment of the instant invention is shown in FIG. 3. For this embodiment the generator comprises three phase windings wound in two sections $108_{A1}$ and $108_{A2}$, $108_{B1}$ and $108_{B2}$, and $108_{C1}$ and $108_{C2}$. For a conventional stator having nominally 36 slots, the phase windings 108 are disposed in only 24 of the 36 stator slots 106. Each section of three phase windings 108 comprise of two fully pitched 23 turn coils per phase connected in series, with only one coil side housed in each slot 106. As can be seen from this figure, the means for saturating the stator 102 comprises saturating coil $118_1$ and $118_2$ wound in two sections using 6 slots each. Each section of saturating coil $118_1$ and $118_2$ was designed to produce no net voltage and to saturate the stator yoke with a combined field strength of not less than 10,000 Ampere/Turns per meter when coupled to a source of dc current (not shown). Each saturating coil $118_1$ and $118_2$ comprise a conductor wound around the stator 102 with 14 turns in each of six adjacent slots 106, giving a total of 84 turns in each section or 168 total saturating turns on the stator 102.

Figure 4:
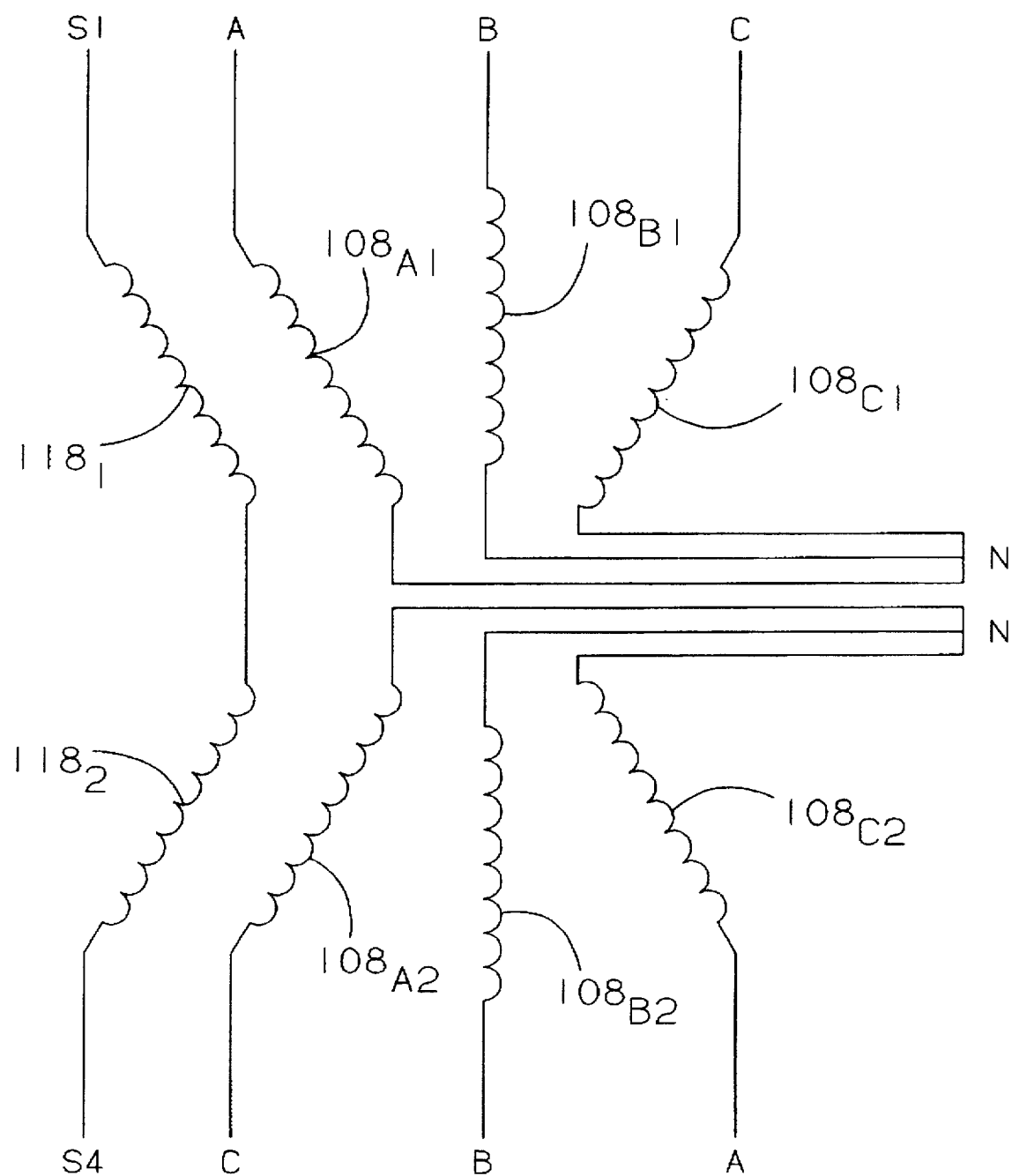
FIG. 4 is an electrical schematic diagram of an embodiment of the instant invention.
Figure 5:
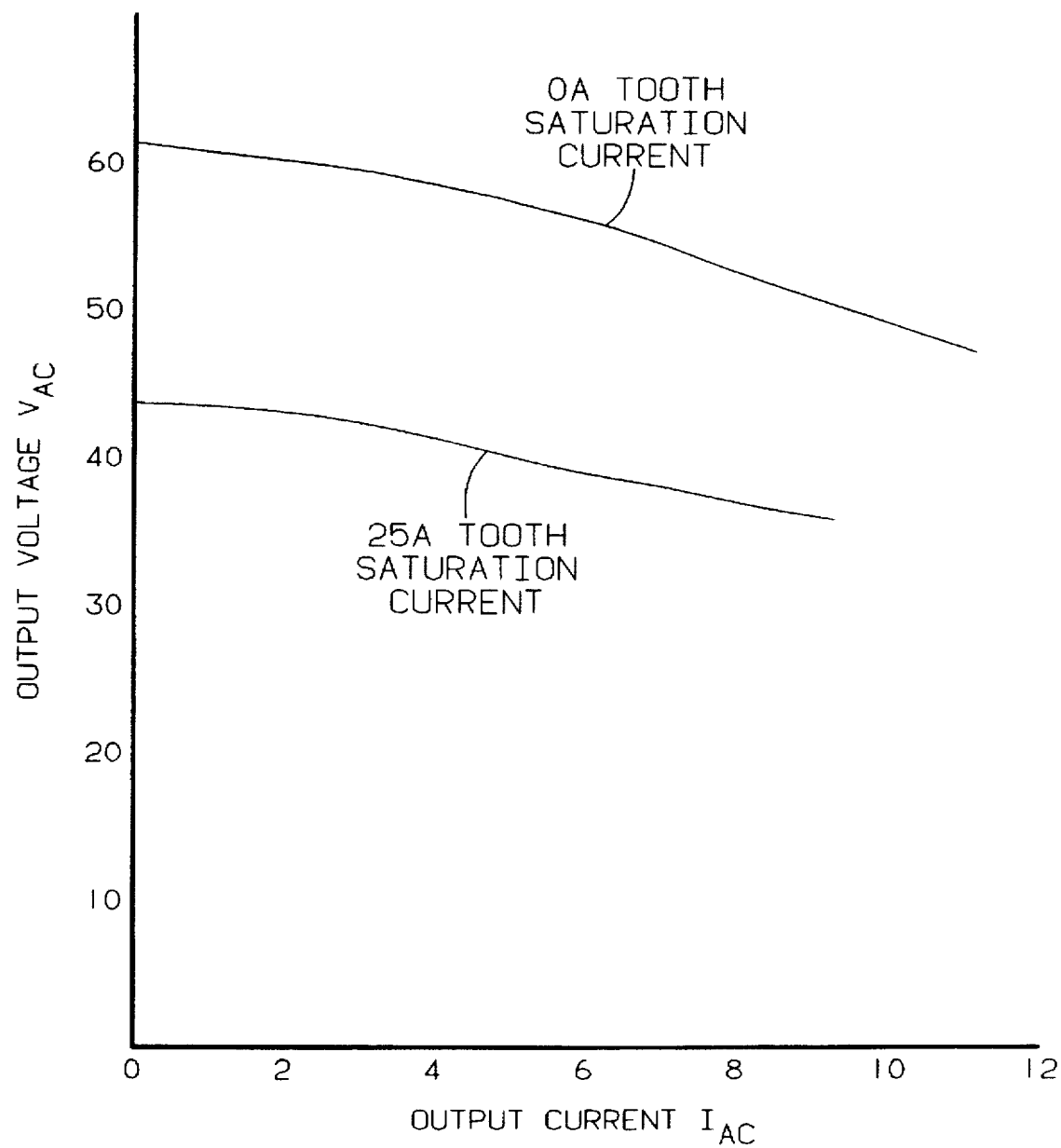
FIG. 5 is an output characteristic graphic illustrating the independence of the output characteristic of the embodiment illustrated in FIG. 4.

For this exemplary embodiment of the instant invention, the two saturating coils $118_1$ and $118_2$ were additively coupled in series, and each phase of the two three phase outputs was connected externally in a series wye connection as shown in FIG. 4. With this configuration, as is apparent to one skilled in the art, the output voltages and currents produced for each three phase section are independent of one another. This independence is illustrated by FIG. 5 which plots the output characteristic of section 1 (windings $108_{A1}$, $108_{B1}$, and $108_{C1}$) of the electric generator as the connected load is increased to a short circuit, and the output of section 2 (windings $108_{A1}$, $108_{B2}$, and $108_{C2}$) which is kept open circuited.

Figure 6:
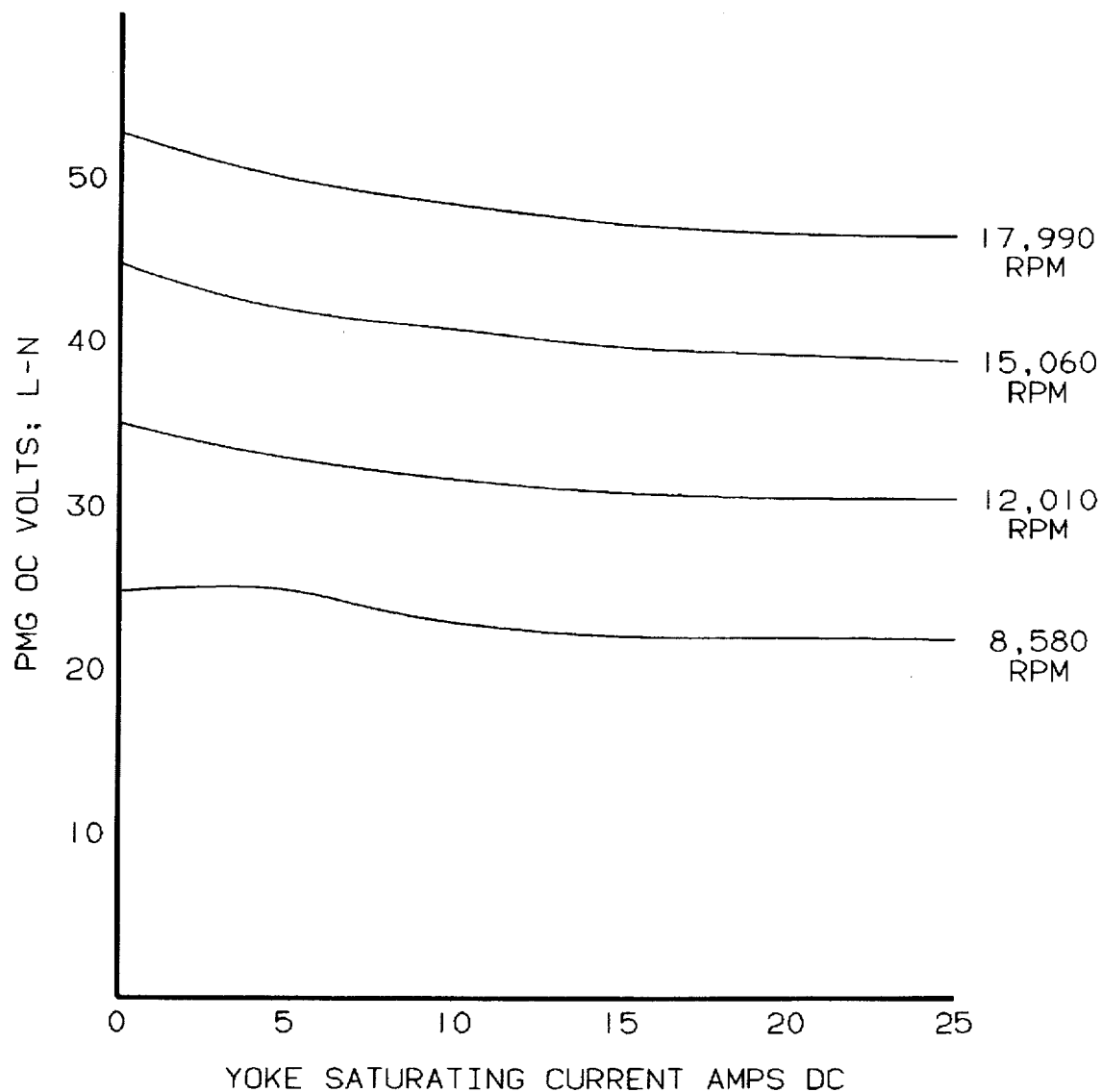
FIG. 6 is a graphic illustration of the output voltage of the embodiment of FIG. 4 with increasing saturation current at various speeds.
Figure 7:
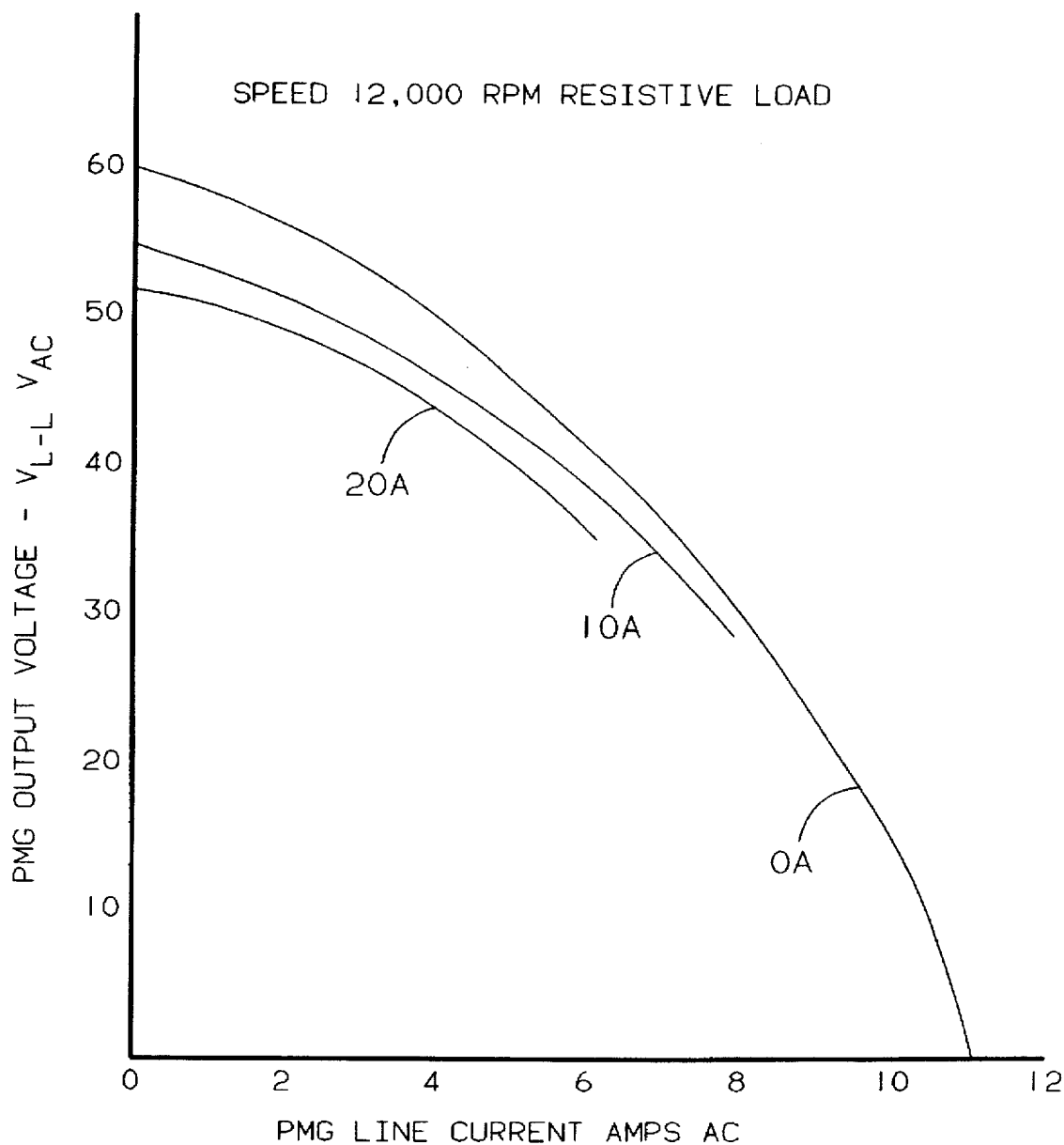
FIG. 7 is a graphic illustration of the output voltage characteristic of the embodiment of FIG. 4 at various saturation current levels.

This exemplary embodiment of the electric generator 100, or more specifically permanent magnet generator (hereinafter PMG), was run at 12,000 rpm and with no three phase load applied and no saturating current flowing, the three phase output voltages were recorded. The saturating current through the series connected saturating coil $118_1$ and $118_2$ was increased to 25A dc in 5A increments and the three phase voltage recorded at each value. This was repeated with the PMG speed set at 8,580 rpm, 15,000 rpm and 18,000 rpm. The decrease in PMG open circuit (OC) output voltage with increasing saturation current is illustrated by the curves of FIG. 6. This PMG was then run at 12,000 rpm, and PMG output characteristics (output voltage vs. load current) were recorded for saturating current levels of zero, 10A dc and 20A dc, as illustrated by the curves of FIG. 7.

Figure 8:
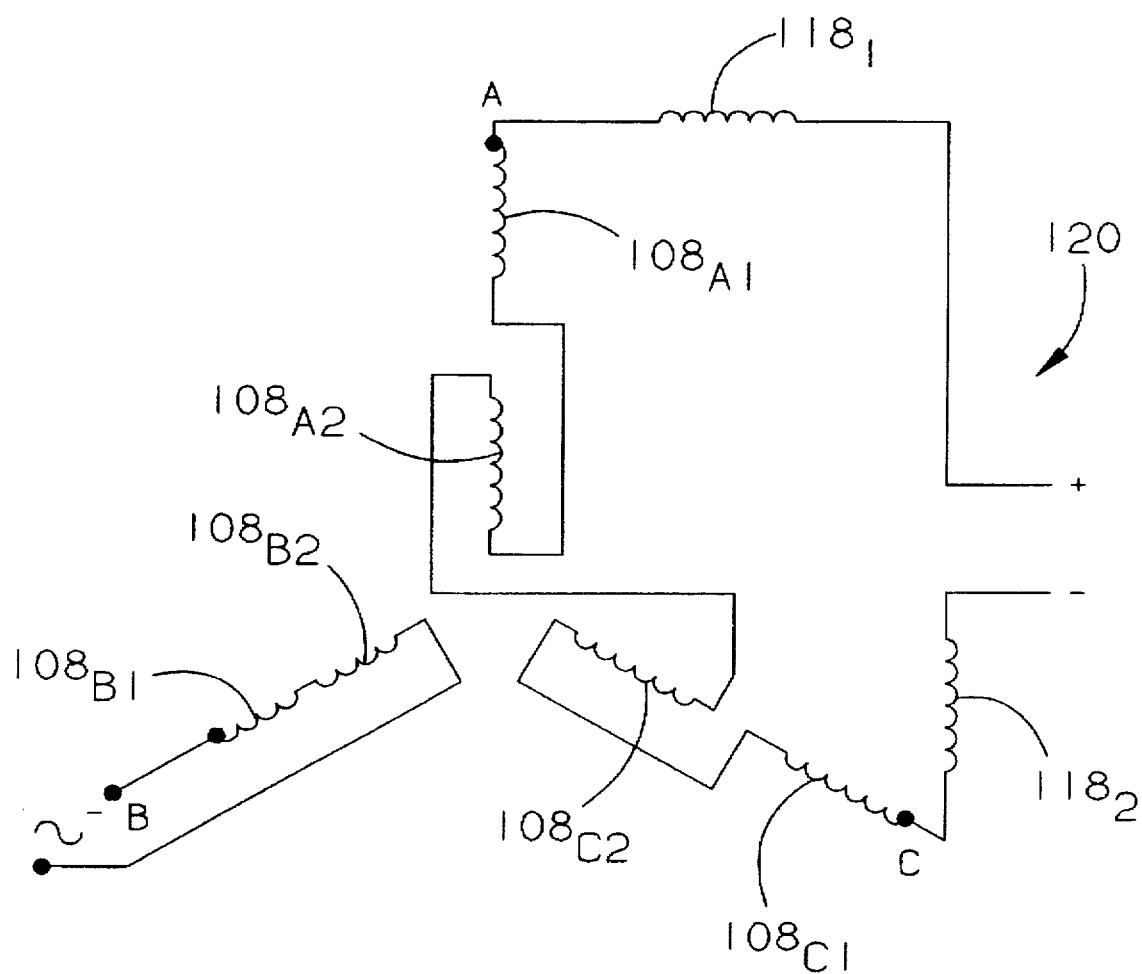
FIG. 8 is an electrical schematic diagram of an embodiment of the instant invention.
Figure 9:
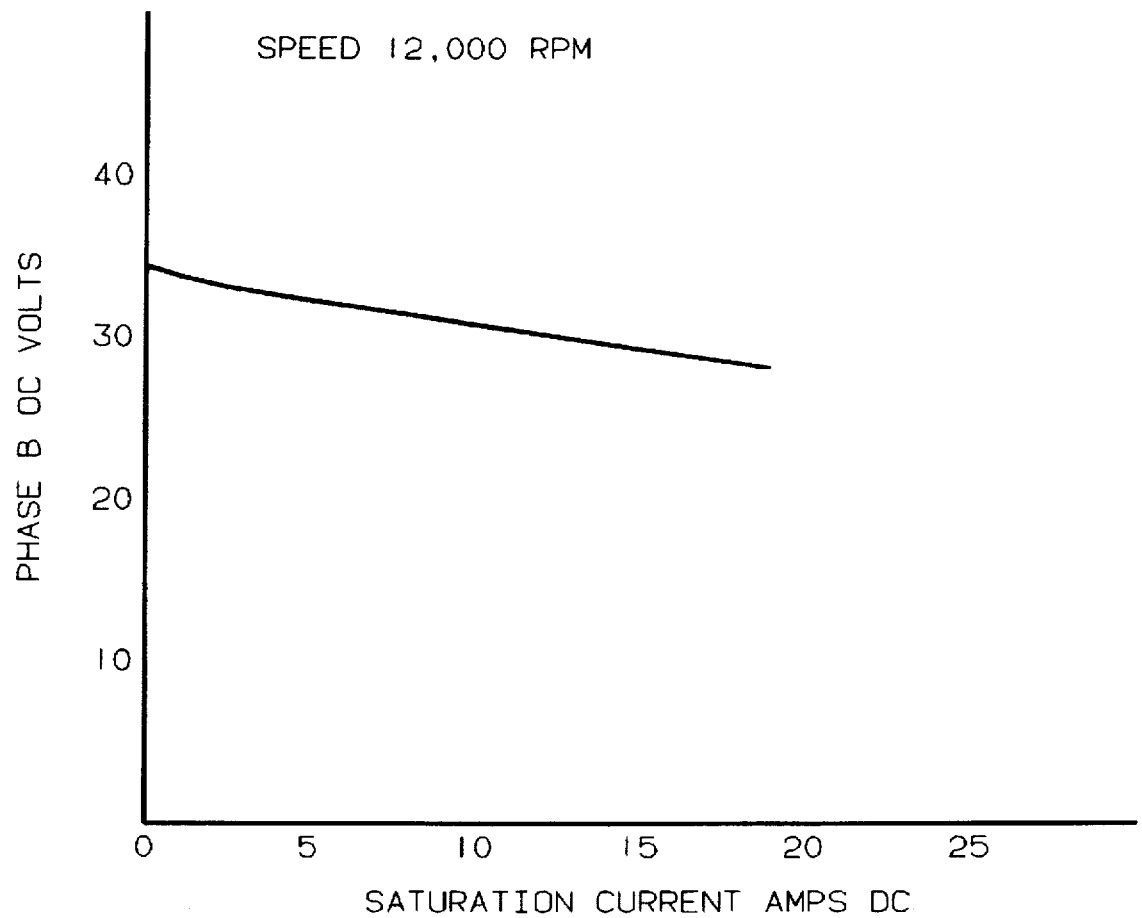
FIG. 9 is a graphic illustration of the output voltage of the embodiment of FIG. 8 with increasing saturation current.

In an alternative exemplary embodiment of the instant invention as illustrated in FIG. 8, the B phase of each of the two three phase sections (windings $108_{B1}$ and $108_{B2}$) were connected additively in series, and the A phase (windings $108_{A1}$ and $108_{A2}$) and also the C phase (windings $108_{C1}$ and $108_{C2}$) of each section were connected in series opposition. The PMG 100 was run at 12,000 rpm to confirm that no significant voltage was generated across the resulting phases A and C. These two phases were then connected in series with the saturating coil (windings $118_1$ and $118_2$) forming a series saturation circuit 120. The PMG 100 was run at 12,000 rpm and the open circuit voltage of the phase B output windings $108_{B1}$ and $108_{B2}$ was recorded with no current and with 5A incrementally increasing DC current flowing in the series saturation circuit 120. The reduction in output voltage versus saturation current is illustrated in FIG. 9. As can be seen, a total reduction in output voltage of approximately 13% is achieved. This reduction is the result of yoke saturation which must, by definition, take place in the back iron behind the slots. At normal flux densities the mmf driving the active flux in the yoke directly behind the teeth 104 represents a small fraction of the total mmf producing active flux in the PMG, but rapidly becomes a larger proportion as the increasing saturation current increases DC flux density behind the slot. As this DC flux builds up, the active magnetic flux decreases (and hence the output voltage drops) as increased mmf is required to drive it through this region. However, once the region is fully saturated, the active flux will not change appreciably and, with no change in flux, the output voltage will not change. The minor linear drop in voltage observed with further increase in saturation current is probably due to the area of saturation propagating into the tops of the teeth.

Figure 10:
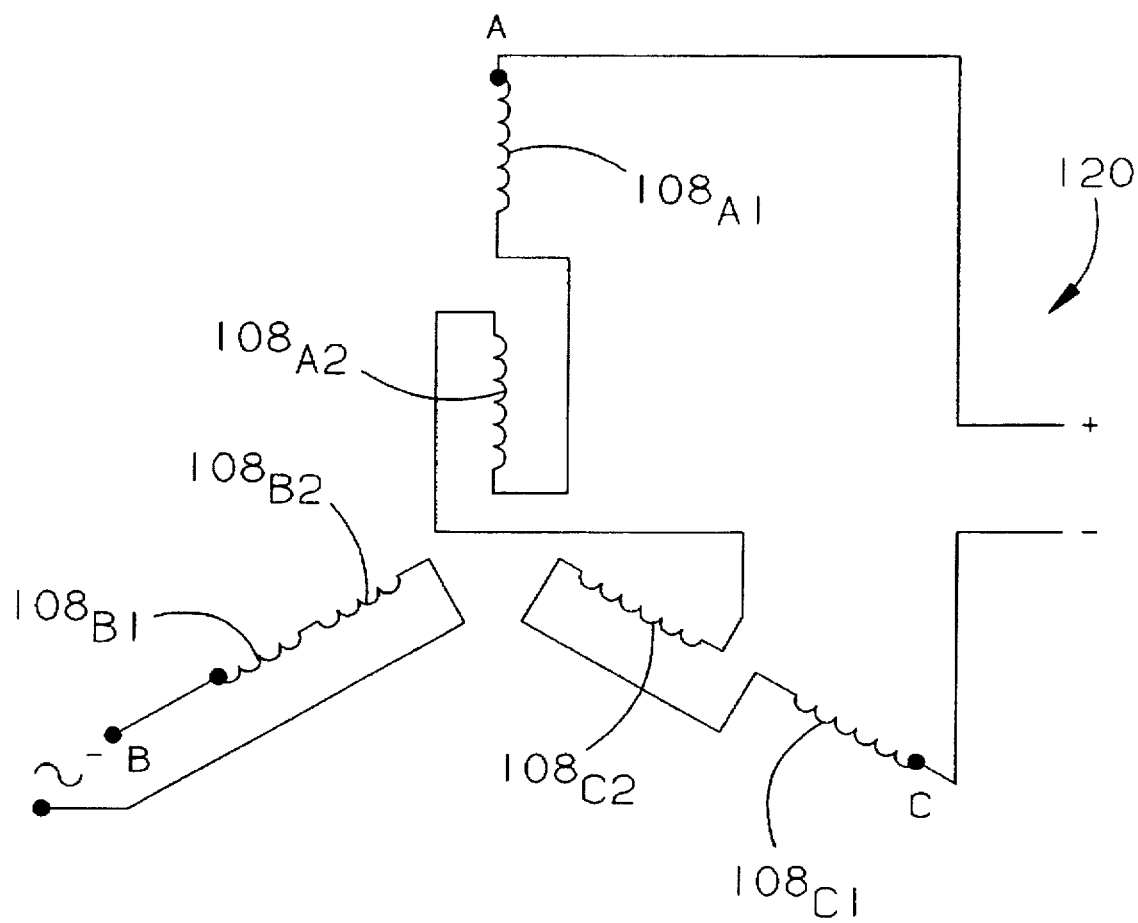
FIG. 10 is an electrical schematic diagram of an embodiment of the instant invention.
Figure 11:
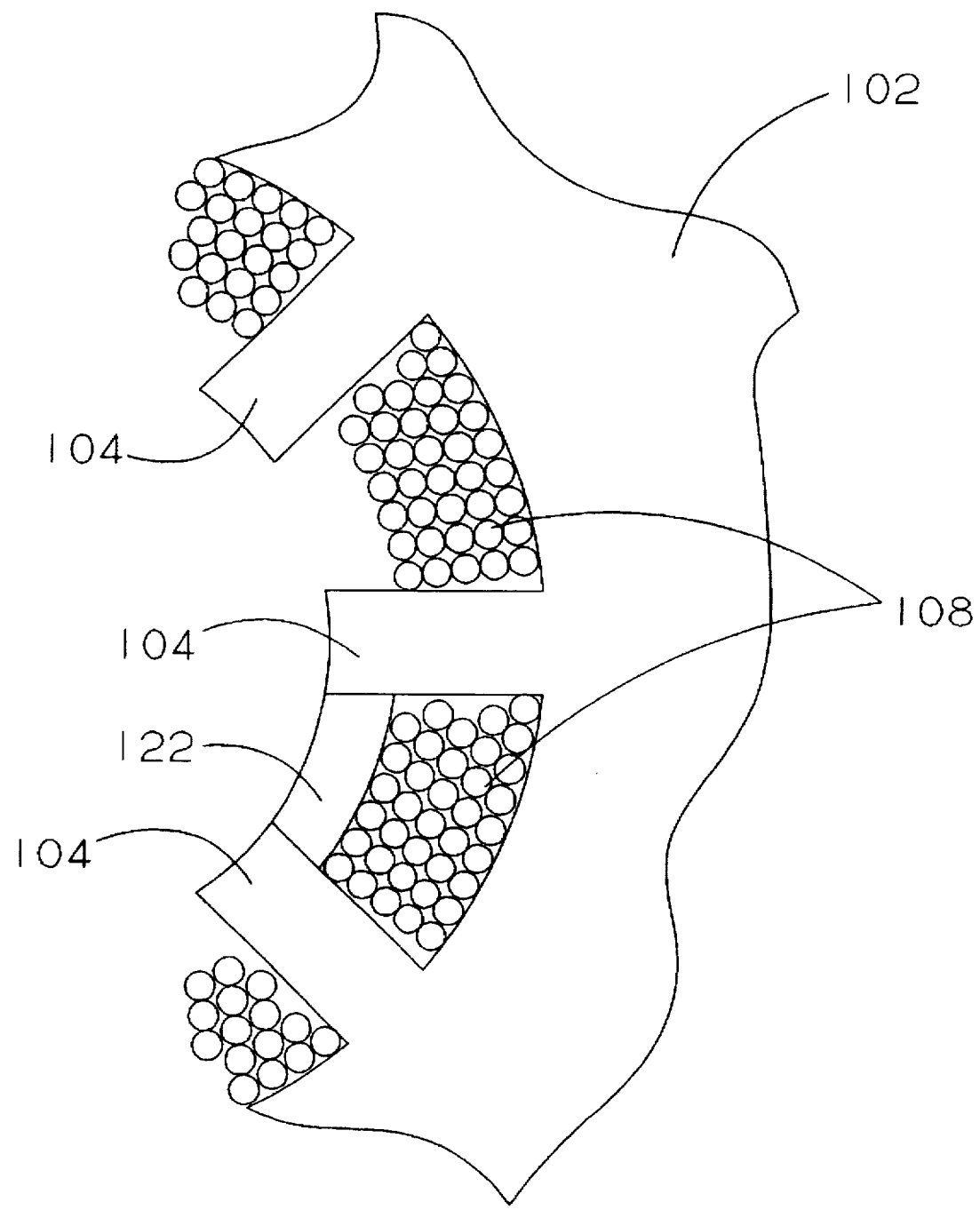
FIG. 11 is a sectional view of the stator of an embodiment of the instant invention illustrating the placement of the magnetic slot closers.
Figure 12:
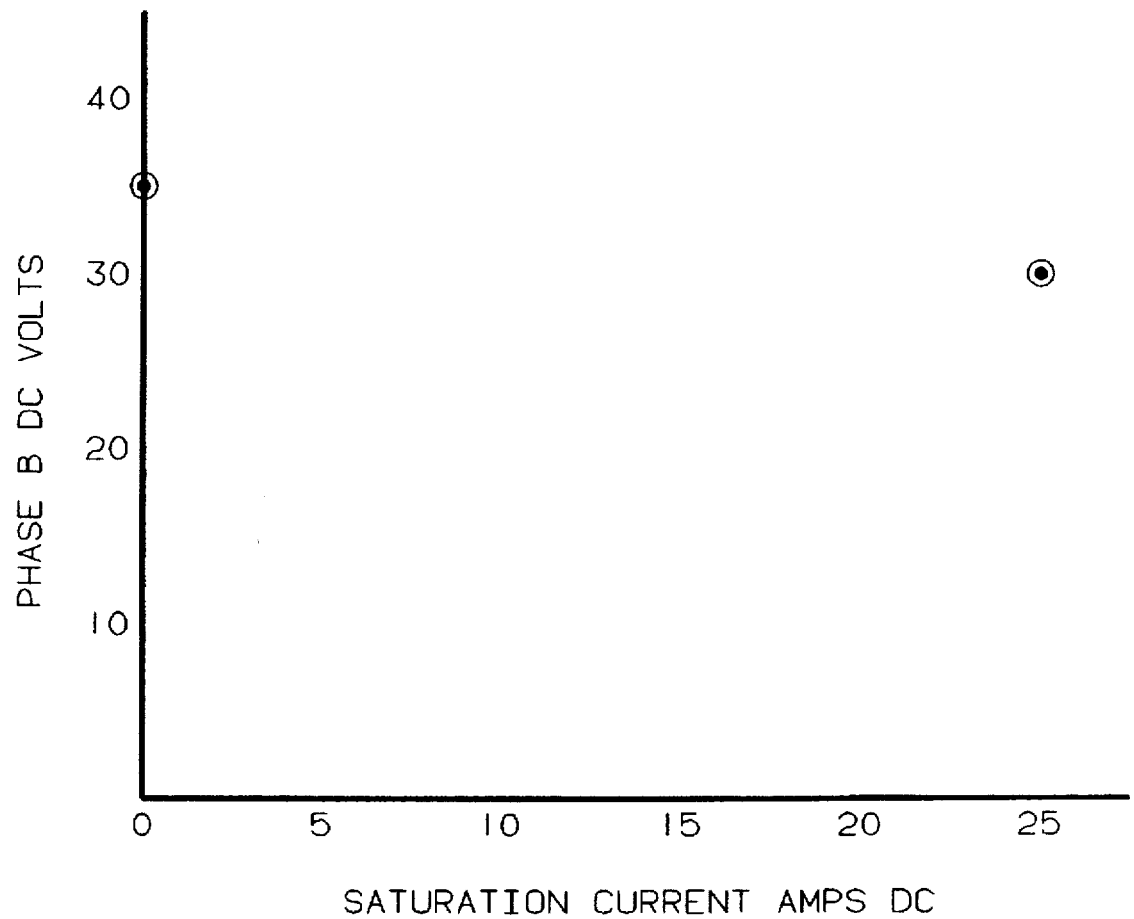
FIG. 12 is a graphic illustration of the output voltage of the embodiment of FIG. 10 with increasing saturation current.

In a further alternate exemplary embodiment, the connection of the three phase windings shown in FIG. 8 was retained but the saturating coils (windings $118_1$ and $118_2$) were disconnected from the series saturation circuit 120 as shown in FIG. 10. Magnetic slot closers 122, such as, for example, strips of material sheared from the end of an annealed Hiperco 50 tensile strip 0.090+0.005 in width for the exemplary embodiment, were inserted into the top (at or near the outer most portion of the stator teeth) of the all the PMG stator slots occupied by phase B windings $108_{B1}$, $108_{B2}$. The PMG was run at 12,000 rpm and the open circuit voltage of the phase B output winding (series combination of $108_{B1}$ and $108_{B2}$) was recorded with zero and maximum available saturation current flowing in the series saturation circuit 120 comprising the A and C phase windings ($108_{A1}$, $108_{A2}$, $108_{C1}$, and $108_{C2}$). The two readings are illustrated in FIG. 12. This embodiment is the result of an investigation of tooth saturation. By comparison with the results obtained previously (FIG. 9) little improvement in voltage modulation was obtained.

Figure 13:
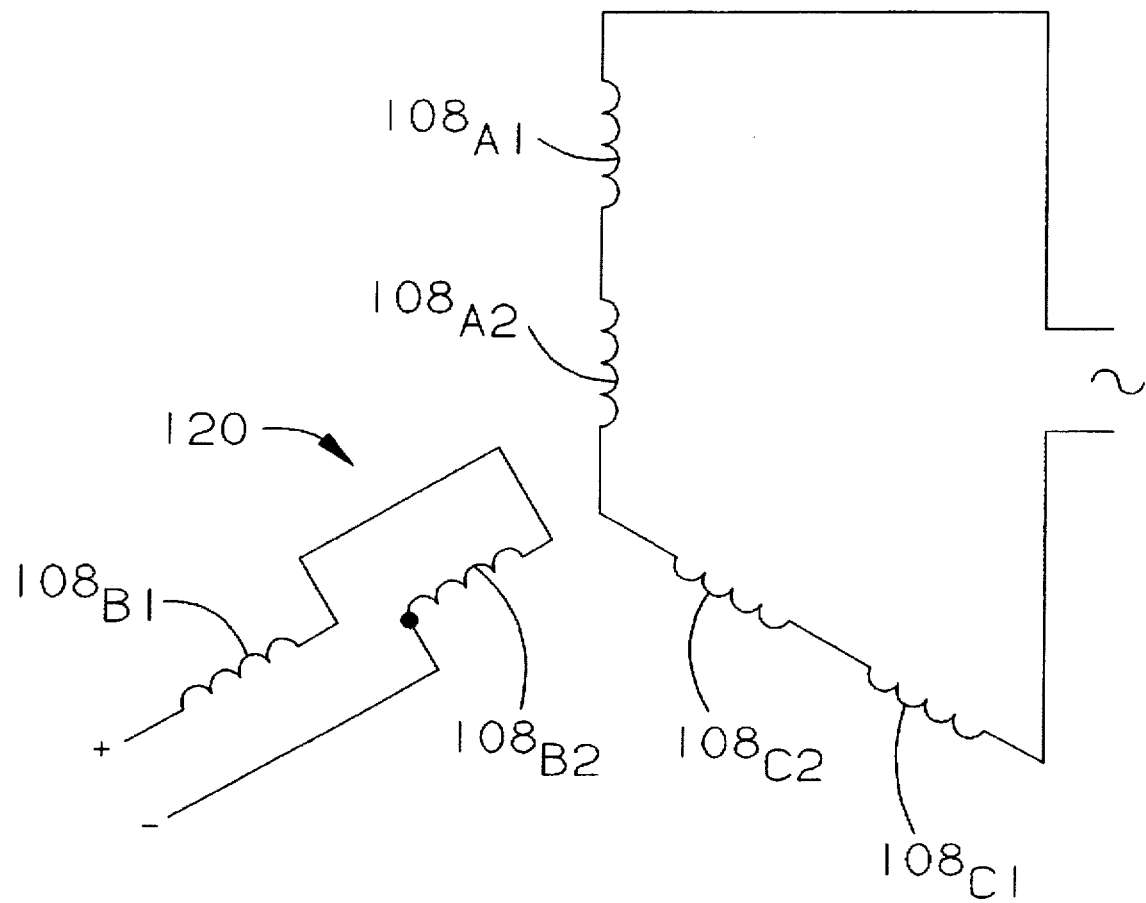
FIG. 13 is an electrical schematic diagram of an embodiment of the instant invention.
Figure 14:
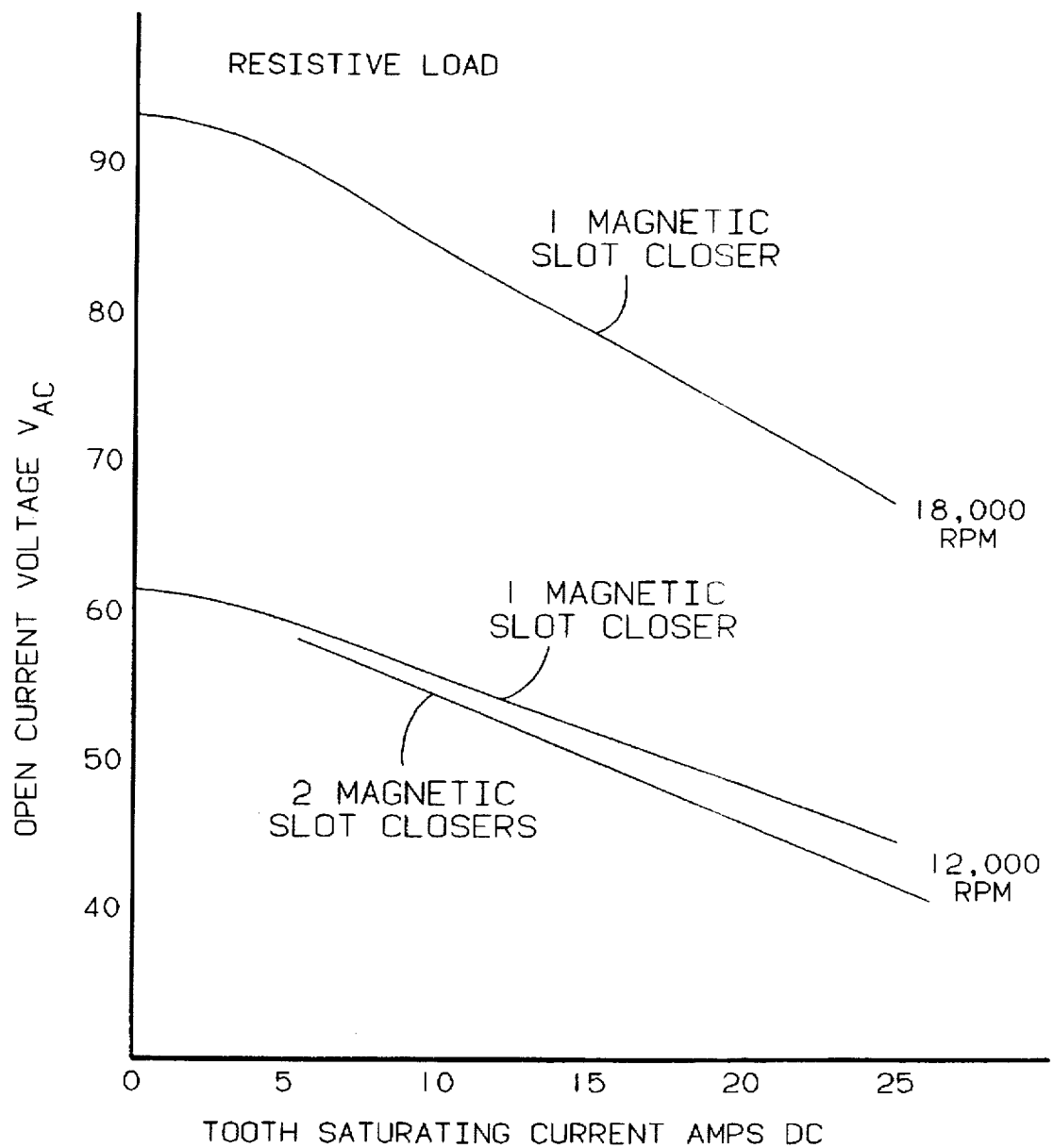
FIG. 14 is a graphic illustration of the output voltage of the embodiment of FIG. 13 with increasing saturation current.
Figure 15:
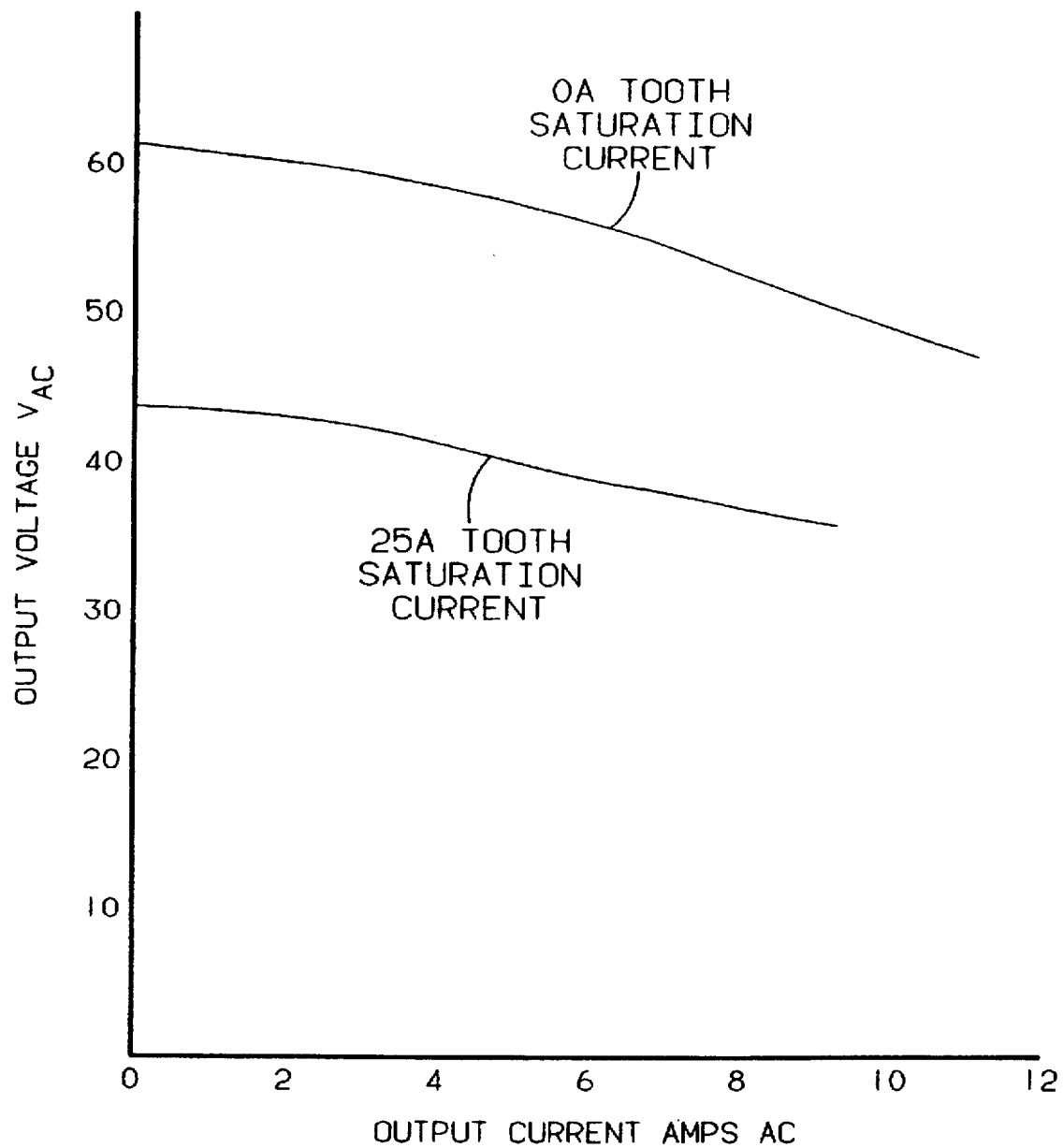
FIG. 15 is a graphic illustration of the output voltage characteristic of the embodiment of FIG. 13 at various saturation current levels.
Figure 16:
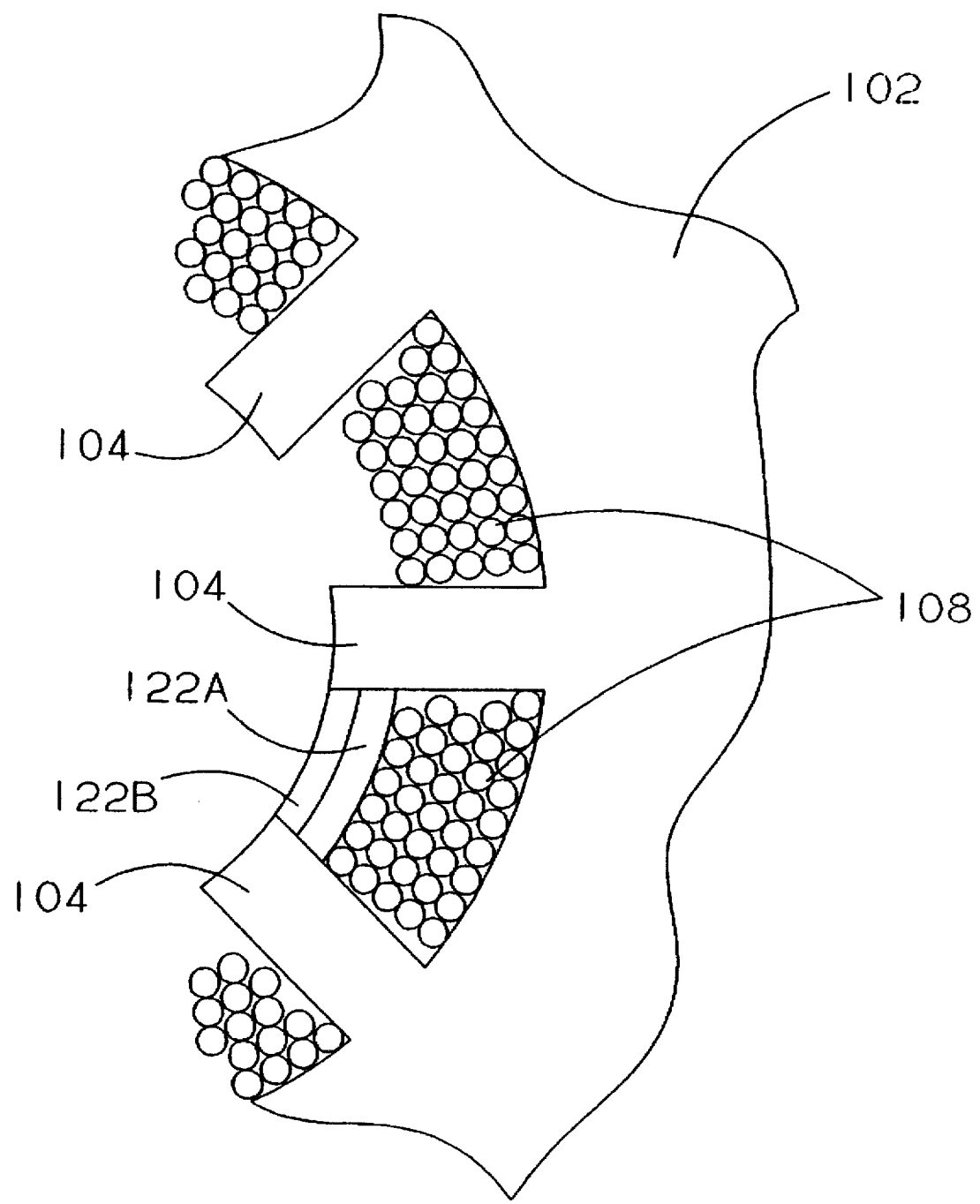
FIG. 16 is a sectional view of the stator of an embodiment of the instant invention illustrating the placement of the magnetic slot closers.

While reviewing the mechanism producing tooth saturation it was realized that for maximum effect the magnetic closers 122 should be in the slots in which saturating current flows to allow the circulation of dc flux to around that slot. This lead to a preferred embodiment of the instant invention in which the two phase A windings $108_{A1}$ and $108_{A2}$ and the two phase C windings $108_{C1}$ and $108_{C2}$ of each section were additively coupled in series and the two phase B windings $108_{B1}$ and $108_{B2}$ were coupled in series opposition. Phase A and phase C ($108_{A1}$, $108_{A2}$, $108_{C1}$, and $108_{C2}$) were connected in series so that the voltages added vectorially. The two phase B windings $108_{B1}$ and $108_{B2}$ were linked in series opposition as shown diagrammatically in FIG. 13. The PMG was run at 12,000 rpm to confirm that no significant voltage was generated across the phase B windings $108_{B1}$ and $108_{B2}$. This series saturation circuit 120 was then connected to an external source of DC current. The PMG was now run at both 12,000 rpm and 18,000 rpm and the open circuit voltage of the phase A and C combination recorded first with no DC current and for DC current increasing in 5A increments. The results are illustrated in FIG. 14. FIG. 15 illustrates the output characteristic for this preferred embodiment of the instant invention running at 12,000 rpm with both zero and 25A saturation current flowing in phase B $108_{B1}$ and $108_{B2}$.

In a highly preferred embodiment of the instant invention, a second magnetic slot closer $122_B$ was inserted into the phase B slots which already contained one strip $122_A$ to enhance the voltage modulation by increasing permeability in the saturating slot magnetic closure. The effect of saturating current on open circuit voltage is also illustrated in FIG. 14. This highly preferred embodiment demonstrates that by saturating the PMG teeth 104 by using strategically placed magnetic slot closers 122, the PMG voltage can be depressed by over 30%.

It was found that greater PMG output voltage modulation can be achieved by saturating the teeth 104 rather than the core 102. Significant voltage modulation can be produced by connecting two phases of the winding to give a single phase output, modifying the third phase to carry a saturating current, and inserting a magnetic slot closer into the mouth of each slot carrying a saturating coil. A more conventional stator winding results from this approach. One slot per pole per phase would appear to be advantageous for this arrangement.

The mechanism of saturation using this preferred embodiment produces a voltage characteristic which falls off almost linearly as the saturating current increases. This is probably due to the fact that flux circulates around the slot containing the saturating coil, using the magnetic slot closer to pass from tooth tip to tooth tip. As the current increases, flux density increases in the tooth tip region and local saturation propagates away from the tooth tip into the body of the tooth. This progressively increases the effective airgap of the PMG and weakens active flux in the core. The voltage then drops in response to this weakening flux. The importance of magnetic slot closers to this effect was demonstrated when a second closer $122_B$ was added to those slots already containing one. This effectively reduced the mmf needed to drive dc flux across the mouth of the gap which was reflected in a greater voltage depression per unit of saturating current. While the preferred embodiment of the instant invention described above illustrates a single phase output, a polyphase output may be provided as an alternate embodiment. This alternate comprises a saturation winding disposed at the bottom of each slot which houses the poly-phase windings, and a magnetic slot closer provided for selected slots.

Figure 17:
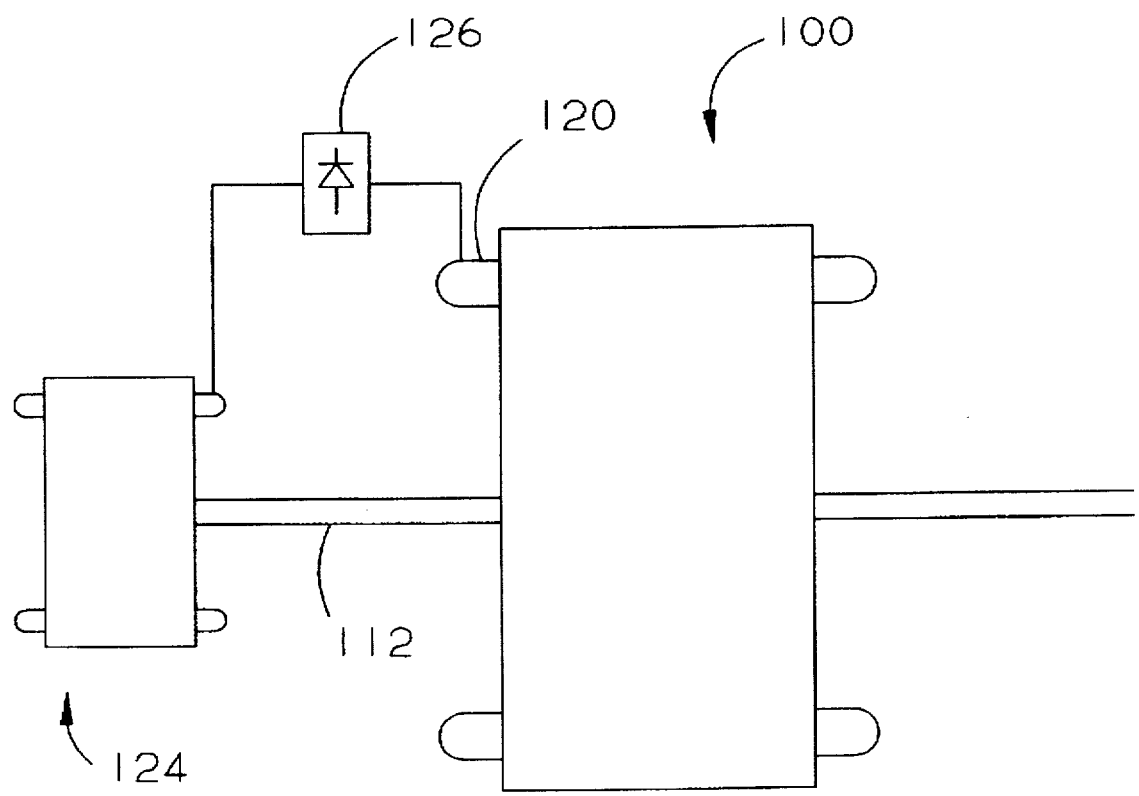
FIG. 17 is a diagrammatic illustration of an embodiment of the instant invention having a separate excitation PMG and a rectifier as an external source of saturation current.

In a further embodiment of the instant invention as illustrated in FIG. 17, the external source of dc current comprises a permanent magnet generator 124 coupled through a rectifier 126 to the series saturation circuit 120. Preferably, this permanent magnet generator 124 is driven at the same speed, or at the same ratio, as the electric generator 100 of the instant invention. This permanent magnet generator 124 could be driven by the same shaft 112 for this purpose. In this way, the regulation characteristics caused by the saturation will in fact be enhanced, as the amount of DC current provided increases to drive the machine 100 further into saturation to suppress its voltage which is also increasing as a result of the increased speed.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. An electric generator, comprising:

a stator having teeth on an inner periphery define a plurality of slots therebetween;

at least two sets of stator windings disposed in the first portion of said slots, said sets of stator windings forming at least two phases;

a rotor rotably mounted within said inner periphery of said stator, said rotor having a plurality of permanent magnets mounted thereon forming rotor poles, said permanent magnets inducing a voltage in said stator windings when said rotor is driven by an external prime mover;

means coupled to an external source of DC current for saturating said stator, said means for saturating decreasing said induced voltage thereby; and wherein said means far saturating said stator comprises at least one yolk saturating coil disposed in a second portion of said slots; and wherein less than all of said sets of stator windings are coupled in series with said yoke saturating coil forming a series saturation circuit, said series saturation circuit being coupled to said external source of DC current.

2. The electric generator of claim 1, further comprising at least an additional associated set of stator windings disposed in a third portion of said slots forming an additional phase associated with each set of stator windings in said first portion of said slots, and wherein each of said sets of stator windings in said series saturation circuit is coupled in series opposition to its additional associated set of stator windings.

3. An electric generator, comprising:

a stator having teeth on an inner periphery defining a plurality of slots therebetween;

at least two sets of stator windings disposed in a first portion of said slots, said sets of stator windings forming at least two phases;

a rotor rotatably mounted within said inner periphery of said stator, said rotor having a plurality of permanent magnets mounted thereon forming rotor poles, said permanent magnets inducing a voltage in said stator windings when said rotor is driven by an external prime mover; and means coupled to an external source of dc current for saturating said stator, said means for saturating decreasing said induced voltage thereby; and wherein said means for saturating said stator comprises additional associated sets of stator windings disposed in a third portion of said slots forming additional phases associated with less than all of said sets of stator windings in said first portion of said slots, said additional associated sets of stator windings being coupled in series opposition to less than all of said sets of stator windings forming a series saturation circuit thereby; and wherein said means for saturating said stator further comprises two magnetic slot closers inserted into said slots in which is disposed said series saturation circuit.

4. An electric generator, comprising:

a stator having teeth on an inner periphery defining a plurality of slots therebetween;

at least two sets of stator windings disposed in a first portion of said slots, said sets of stator windings forming at least two phases;

a rotor rotatably mounted within said inner periphery of said stator, said rotor having a plurality of permanent magnets mounted thereon forming rotor poles, said permanent magnets inducing a voltage in said stator windings when said rotor is driven by an external prime mover; and means coupled to an external source of dc current for saturating said stator, said means for saturating decreasing said induced voltage thereby; and wherein said means for saturating said stator comprises additional associated sets of stator windings disposed in a third portion of said slots forming additional phases associated with less than all of said sets of stator windings in said first portion of said slots, said additional associated sets of stator windings being coupled in series opposition to less than all of said sets of stator windings forming a series saturation circuit thereby; and wherein said means for saturating said stator further comprises at least one magnetic slot closer inserted into said slots in which is disposed said series saturation circuit.

5. The electric generator of claim 4, wherein said magnetic slot closer is inserted into said slots housing said series saturation circuit at or near an outer most portion of said stator teeth.

6. An electric generator, comprising:

a stator having teeth on an inner periphery defining a plurality of slots therebetween;

at least two sets of stator windings disposed in a first portion of said slots, said sets of stator windings forming at least two phases;

a rotor rotatably mounted within said inner periphery of said stator, said rotor having a plurality of permanent magnets mounted thereon forming rotor poles, said permanent magnets inducing a voltage in said stator windings when said rotor is driven by an external prime mover;

means coupled to an external source of dc current for saturating said stator, said means for saturating decreasing said induced voltage thereby; and wherein said external source of dc current comprises a permanent magnet generator driven by the prime mover, said permanent magnet generator generating an ac output, and a rectifier coupled to said ac output for producing dc saturating current on a dc output, said dc output coupled to said series saturation circuit.

7. The electric generator of claim 6, wherein said permanent magnet generator is driven at a same speed as said rotor.

8. The electric generator of claim 6, wherein said rotor is driven by the prime mover by a shaft, and wherein said permanent magnet generator is also driven by said shaft.

9. An electric generator, comprising:

a stator having teeth on an inner periphery defining a plurality of slots therebetween;

a first, a second, and a third set of stator windings disposed in the first portion of said slots, said first, second, and third set of stator windings forming a first, a second, and a third phase respectively;

a rotor rotably mounted within said inner periphery of said stator, said rotor having a plurality of permanent magnets mounted thereon forming rotor poles, said permanent magnets inducing a voltage in said stator windings when said rotor is driven by an external prime mover; and wherein said means for saturating said stator comprises at least one yolk saturating coil disposed in a second portion of said slots; and wherein less than all of said sets of stator windings are coupled in series with said yoke saturating coil forming a series saturation circuit, said series saturation circuit being coupled to said external source of DC current.

10. The electric generator of claim 9, further comprising at least a fourth, a fifth, and a sixth additional associated set of stator winding disposed in a third portion of said slots forming an additional first, second, and third phase respectively associated with each set of stator windings in said first portion of said slots, and wherein each of said sets of stator windings in said series saturation circuit is coupled in series opposition to its additional associated set of stator windings.

11. An electric generator, comprising:

a stator having teeth on an inner periphery defining a plurality of slots therebetween;

a first, a second, and a third set of stator windings disposed in a first portion of said slots, said first, second, and third set of stator windings forming a first, a second, and a third phase respectively;

a rotor rotatably mounted within said inner periphery of said stator, said rotor having a plurality of permanent magnets mounted thereon forming rotor poles, said permanent magnets inducing a voltage in said stator windings when said rotor is driven by an external prime mover; and means coupled to an external source of dc current for saturating said stator, said means for saturating decreasing said induced voltage thereby; and wherein said means for saturating said stator comprises additional associated sets of stator windings disposed in a third portion of said slots forming additional phases associated with less than all of said sets of stator windings in said first portion of said slots, said additional associated sets of stator windings being coupled in series opposition to less than all of said sets of stator windings forming a series saturation circuit thereby; and wherein said means for saturating said stator further comprises two magnetic slot closers inserted into said slots in which is disposed said series saturation circuit.

12. An electric generator, comprising:

a stator having teeth on an inner periphery defining a plurality of slots therebetween;

a first, a second, and a third set of stator windings disposed in a first portion of said slots, said first, second, and third set of stator windings forming a first, a second, and a third phase respectively;

a rotor rotatably mounted within said inner periphery of said stator, said rotor having a plurality of permanent magnets mounted thereon forming rotor poles, said permanent magnets inducing a voltage in said stator windings when said rotor is driven by an external prime mover; and means coupled to an external source of dc current for saturating said stator, said means for saturating decreasing said induced voltage thereby; and wherein said means for saturating said stator comprises additional associated sets of stator windings disposed in a third portion of said slots forming additional phases associated with less than all of said sets of stator windings in said first portion of said slots, said additional associated sets of stator windings being coupled in series opposition to less than all of said sets of stator windings forming a series saturation circuit thereby; and wherein said means for saturating said stator further comprises at least one magnetic slot closer inserted into said slots in which is disposed said series saturation circuit.

13. The electric generator of claim 12, wherein said magnetic slot closer is inserted into said slots housing said series saturation circuit at or near an outer most portion of said stator teeth.

14. An electric generator, comprising:

a stator having teeth on an inner periphery defining a plurality of slots therebetween;

a first, a second, and a third set of stator windings disposed in a first portion of said slots, said first, second, and third set of stator windings forming a first, a second, and a third phase respectively;

a rotor rotatably mounted within said inner periphery of said stator, said rotor having a plurality of permanent magnets mounted thereon forming rotor poles, said permanent magnets inducing a voltage in said stator windings when said rotor is driven by an external prime mover;

means coupled to an external source of dc current for saturating said stator, said means for saturating decreasing said induced voltage thereby; and wherein said external source of dc current comprises a permanent magnet generator driven by the prime mover, said permanent magnet generator generating an ac output, and a rectifier coupled to said ac output for producing dc saturating current on a dc output, said dc output coupled to said series saturation circuit.

15. The electric generator of claim 14, wherein said permanent magnet generator is driven at a same speed as said rotor.

16. The electric generator of claim 14, wherein said rotor is driven by said prime mover by a shaft, and wherein said permanent magnet generator is also driven by said shaft.

17. An electric generator, comprising:

a stator having teeth on an inner periphery defining a plurality of slots therebetween;

a first, a second, a third, a fourth, a fifth, and a sixth set of stator windings disposed in a first portion of said slots, said first, second, third, fourth, fifth, and sixth set of stator windings forming a first, a second, a third, a fourth, a fifth, and a sixth phase respectively, said first and said fourth phases additively coupled in series forming a first output phase, said second and said fifth phases coupled in series opposition forming a series saturation circuit, and said third and said sixth phases additively coupled in series forming a second output phase;

a rotor rotatably mounted within said inner periphery of said stator, said rotor having a plurality of permanent magnets mounted thereon forming rotor poles, said permanent magnets inducing a voltage in said stator windings when said rotor is driven by an external prime mover; and at least one magnetic slot closer inserted into said slots in which are disposed said second and said fifth sets of stator windings.

18. An electric generator, comprising:

a stator having teeth on an inner periphery defining a plurality of slots therebetween;

a first, a second, a third, a fourth, a fifth, and a sixth set of stator windings disposed in a first portion of said slots, said first, second, third, fourth, fifth, and sixth sat of stator windings forming a first, a second, a third, a fourth, a fifth, and a sixth phase respectively, said first and said fourth phases additively coupled in series forming a first output phase, said second and said fifth phases coupled in series opposition forming a series saturation circuit, and said third and said sixth phases additively coupled in a series forming a second output phase;

a rotor rotably mounted within said inner periphery of said stator, said rotor having a plurality of permanent magnets mounted thereon forming rotor poles, said permanent magnets inducing a voltage in said stator windings when said rotor is driven by an external prime mover;

at least one magnetic slot closer inserted into said slots in which are disposed said second and said fifth sets of stator windings; and wherein an external source of DC current is coupled to said series saturation circuit for saturating said stator, said series saturation circuit decreasing said induced voltage upon flow of DC current.

19. An electric generator, comprising:

a stator having teeth on an inner periphery defining a plurality of slots therebetween;

a first, a second, a third, a fourth, a fifth, and a sixth set of stator windings disposed in a first portion of said slots, said first, second, third, fourth, fifth, and sixth set of stator windings forming a first, a second, a third, a fourth, a fifth, and a sixth phase respectively, said first and said fourth phases additively coupled in series forming a first output phase, said second and said fifth phases coupled in series opposition forming a series saturation circuit, and said third and said sixth phases additively coupled in series forming a second output phase;

a rotor rotatably mounted within said inner periphery of said stator, said rotor having a plurality of permanent magnets mounted thereon forming rotor poles, said permanent magnets inducing a voltage in said stator windings when said rotor is driven by an external prime mover;

at least one magnetic slot closer inserted into said slots in which are disposed said second and said fifth sets of stator windings; and wherein an external source of dc current is coupled to said series saturation circuit for saturating said stator, said series saturation circuit decreasing said induced voltage upon flow of dc current; and wherein said external source of dc current comprises a permanent magnet generator driven by the prime mover, said permanent magnet generator generating an ac output, and a rectifier coupled to said ac output for producing dc saturating current on a dc output, said dc output coupled to said series saturation circuit.

20. The electric generator of claim 19, wherein said permanent magnet generator is driven at a same speed as said rotor.

21. The electric generator of claim 19, wherein said rotor is driven by the prime mover by a shaft, and wherein said permanent magnet generator is also driven by said shaft.

22. The electric generator of claim 19, wherein said dc saturating current increases with increasing speed of said prime mover.

23. An electric generator, comprising:

a stator having teeth on an inner periphery defining a plurality of slots therebetween;

at least one set of stator windings disposed in a first portion of said slots, said at least one set of stator windings forming at least one output phase;

a rotor rotatably mounted within said inner periphery of said stator, said rotor having a plurality of permanent magnets mounted thereon forming rotor poles, said permanent magnets inducing a voltage in said output phase when said rotor is driven by an external prime mover; and means for saturating said stator teeth, said means decreasing said induced voltage in said output phase thereby; and wherein said means for saturating said stator teeth comprises at least one set of saturation windings disposed in a second portion of said slots, and wherein said saturation windings are coupled to a source of dc current; and wherein said means for saturating said stator teeth further comprises at least one magnetic slot closer inserted into said stator slots in which are disposed said saturation windings.

* * * * *